United States Patent Office 3,632,838
Patented Jan. 4, 1972

3,632,838
SURFACE COATINGS BASED ON COPOLYMERS CONTAINING ETHERIFIED N-METHYLOLAMIDE GROUPS
Hans Wilhelm, Heinsheim, Gerhard Faulhaber, Mannheim, Matthias Marx, Bad Durkheim, and Ernst Wilhelm Hann, Ludwigshafen, Germany, assignors to Badische Anilin- & Soda-Fabrik Aktiengesellschaft, Ludwigshafen (Rhine), Germany
No Drawing. Filed Dec. 11, 1968, Ser. No. 783,111
Claims priority, application Germany, Dec. 13, 1967, P 16 69 091.8
Int. Cl. C09d 3/52, 3/66, 3/76
U.S. Cl. 260—885    3 Claims

ABSTRACT OF THE DISCLOSURE

Surface coatings based on a dispersion of a copolymer (I) which contains units of (A) 50 to 95% by weight of a copolymerizable ester of a monoolefinically unsaturated carboxylic acid having three to five carbon atoms and an alcohol having one to eight carbon atoms; (B) 0.75 to 25% by weight of an N-methylolamide of a copolymerizable olefinically unsaturated carboxylic acid having three to five carbon atoms which has been etherified with an alcohol having one to eight carbon atoms; and (D) 0 to 40% by weight of at least one other copolymerizable monoolefinically unsaturated monomer. Copolymer I is prepared by polymerizing the said monomers in an organic liquid in which the copolymer (I) is insoluble, in the presence of a polymer (II) or polycondensates (II) or a mixture of both which is dissolved in the organic liquid using a conventional polymerization initiator.

The invention relates to surface coatings based on a dispersion of a copolymer containing etherified N-methylolamide groups as the binder.

It is known that copolymers of esters of acrylic or methacrylic acid ethers of N-methylolacrylamide or N-methylolmethacrylamide and other monoolefinically unsaturated monomers, such as monoesters of acrylic or methacrylic acid with polyhydric hydroxyl compounds, dissolved in an organic solvent, may be used for baking enamels.

Surface coatings prepared from these compositions have the serious disadvantage that the solutions of the copolymers (which have a high molecular weight) are difficult to apply owing to their high viscosity. If it is desired to make application easier, it is necessary to decrease the molecular weight of the copolymers. For example the solution polymer described in Example 1 of U.K. patent specification No. 1,062,286 which can be used for coating purposes, has a K value of only 20. It has not hitherto been possible to use highly concentrated solutions of high molecular weight copolymers as surface coatings.

It is an object of this invention to provide surface coatings which have a high content of binder while having the lowest possible viscosity. Another object is coating materials which give coatings having improved properties, for example improved elasticity and resistance to hydrolysis.

In accordance with the present invention a coating composition based on a dispersion of a copolymer containing etherified N-methylolamide groups as a binder contains a copolymer (I) of (A) 50 to 95% by weight of a copolymerizable ester of a monoolefinically unsaturated carboxylic acid having three to five carbon atoms and an alcohol having one to eight carbon atoms; (B) 0.75 to 25% by weight of at least one N-methylolamide of a copolymerizable olefinically unsaturated carboxylic acid having three to five carbon atoms which has been etherified with an alcohol having one to eight carbon atoms; and (C) 0 to 40% by weight of at least one other copolymerizable monoolefinically unsaturated monomer; dispersed in an organic liquid in which the copolymer (I) is insoluble, the said dispersion having been prepared by polymerization of the said monomers in the organic liquid in the presence of a free radical forming initiator and in the presence of a polymer (II) or polycondensate (II) (or a mixture of a polymer (I) and a polycondensate (II)) having a molecular weight of more than 1200, which is compatible with the copolymer (I), which is soluble in the organic liquid and which has a dispersing action.

Coating compositions according to this invention are particularly distinguished by the fact that they have a high concentration of solids in the binder, a high molecular weight of the copolymer having achieved at the same time. In this way the coatings prepared from the copolymers according to this invention have as compared with coatings prepared from prior art copolymers of the same type which have been prepared by solution polymerization, a number of advantageous properties in addition, such as elasticity and freedom from tackiness. Moreover, it is possible to decrease the proportion of crosslinking components for subsequent crosslinking and to reduce the extent of crosslinking. The coatings thus become much more elastic. The compositions give coatings having improved adherence and shock resistance as well as outstanding resistance to hydrolysis. Furthermore coatings can be obtained which have particularly good color fastness flexural strength, solvent resistance, weather resistance and hardness a well as other properties.

The following may be said concerning the copolymer (I) dispersed in the organic liquid:

(A) As the copolymerizable esters of monoolefinically unsaturated carboxylic acids having three to five carbon atoms and alcohols having one to eight carbon atoms and particularly alkanols having an average of one to four carbon atoms it is preferred to use the esters of acrylic and/or methacrylic acid such as methyl acrylate, methyl methacrylate, ethyl acrylate, tert-butyl acrylate, tert-butyl methacrylate or mixtures of these esters with one another or with 2-ethylhexyl esters. The corresponding diesters of maleic, fumaric or itaconic acids or for example esters of acrylic or methacrylic acid with an alkanediol monoacetoacetic ester are also suitable.

The amount and type of ester or ester-mixture chosen depends on the intended application of the composition. The monomers (A) should be contained as polymerized units in the copolymer (I) in amounts of from 50 to 95% by weight and preferably 60 to 80% by weight.

(B) Suitable ethers of an N-methylolamide of a copolymerizable carboxylic acid having three to five carbon atoms with an alcohol having one to eight carbon atoms, which are used in amounts of 0.75 to 25% by weight and particularly 2.5 to 17.5% by weight of polymerizable units in the copolymer are for example the ethers of N-methylolacrylamide, N-methylolmethyacrylamide, N-methylolcrotonamide, and N,N'-dimethylolitaconic diamide with n-butanol, isobutanol, 2-ethylhexyl alcohol, benzyl alcohol or ethylene glycol monomethyl ether. The butyl ether of N-methylolacrylamide or of N-methylolmethacrylamide is preferred.

(C) The copolymer (I) may be modified in the conventional manner by introducing 0 to 40% by weight and particularly 0.5 to 25% by weight of polymerized units of other monolefinically unsaturated monomers. Commercially available comonomers are suitable for this purpose. The following may be cited as suitable comonomers: vinylaromatics such as styrene or vinyltoluene, it being kept in mind of course that the solubility of the copolymer (I) in hydrocarbons can be increased by increasing the content of these monomers. The following are very suitable in amounts of from 1 to 40, particularly from 2 to 25% by weight: monomers which introduce hydroxyl groups into the copolymer such as hemiesters of oxaalkanediols and alkanediols having two to six carbon atoms and acrylic or methacrylic acid, for example the monoacrylates or monomethacrylates of butanediol-1,4, pentanediol - 1,5, propanediol - 1,2 or propanediol - 1,3, ethylene glycol or diethylene glycol, amides and/or nitriles of unsaturated carboxylic acids, such as methacrylamide, acrylonitrile, methacrylonitrile, N-vinylamides and N-vinyllactams such as N-vinyl-N-methylacetamide, N-vinylpyrrolidone, or N-vinylcaprolactam. It is very advantageous to use monolefinically unsaturated carboxylic acids having three to five carbon atoms such as acrylic acid, methacrylic acid, itaconic acid, maleic acid, maleic anhydride or crotonic acid in amounts of up to 15% and particularly from 0.5 to 5% by weight. Vinyl esters of monocarboxylic acids having two to eleven carbon atoms, among which vinyl acetate, vinyl propionate, vinyl butyrate and vinyl pivalate may be mentioned particularly, are also suitable comonomers (C). The type and amount of comonomers chosen always depends on the intended application of the coating composition and the properties required in the coatings prepared therefrom.

Preferred copolymers (I) may consist for example of 65 to 82% by weight of a methyl and/or ethyl acrylate and/or methacrylate, 5 to 17.5% by weight of an alkyl ether of N-methylolacrylamide and/or N-methylolmethacrylamide, 2 to 25% by weight of a monoacrylate and/or monomethacrylate of an alkanediol having two to four carbon atoms and 0 to 5%, particularly 0.5 to 4%, by weight of an unsaturated carboxylic acid of the said type.

Organic liquids which are liquid within a range of from −20° to +30° C. and have boiling points of from 30° to 300° C., particularly from 50° to 200° C., are suitable as the organic liquids in which the dispersions according to the invention are prepared. These liquids are in particular hydrocarbons of aromatic, aliphatic, hydroaromatic and araliphatic character and also for example ketones, ethers or esters and mixtures of organic liquids. Examples of very suitable hydrocarbons are hexane, heptane, octane, nonane, cyclohexane, white spirit, gasoline, xylene mixtures, terpenes, and solvent naphthas of aromatic, aliphatic or naphthenic nature. Naturally mixtures of these substances with one another may also be used. It is crucial that the copolymer containing etherified N-methylolamide groups formed in the organic liquid should be substantially insoluble therein. A certain small amount of solvent which dissolves the copolymer (I) may however be present. The use of such solvents permits regulation of the viscosity of the copolymer dispersion formed, in that a small portion of the solvent is soluble in the copolymer whereas the major portion is insoluble. Minor amounts of paraffins or other solid hydrocrabons may also be added to the organic liquids. Hydrocarbon media having predominantly non-aromatic constituents are preferred as organic liquids.

The dispersions of copolymers (I) according to the invention should be prepared by polymerization of the abovementioned monomers as units of the copolymer (I) in the organic liquid in the presence of a polymer and/or polycondensate (II) having a molecular weight of more than 1200. It is advantageous to use these in amounts of from 1 to 22% and particularly from 2 to 20% by weight with reference to the copolymer (I) to be dispersed.

The polymer and/or polycondensate (II) should be substantially compatible with the copolymer and substantially (and preferably completely) soluble in the organic liquid used. Examples of suitable polymers (II) are the dispersing agents described in U.K. patent specifications Nos. 924,623 and 934,038. Particularly suitable polymers (II) are copolymers of: (a) at least 50% by weight and particularly from 65 to 80% by weight of an ester of acrylic acid and/or methacrylic and an alkanol having four to eighteen carbon atoms such as the n-butyl, lauryl, stearyl and particularly the 2-ethylhexyl and octyl esters; (b) from 0 to 30% by weight of an ester of acrylic and/or methacrylic acid and an alkanol having one to three carbon atoms such as ethyl acrylate or methyl methacrylate; (c) from 0 to 30% by weight and particularly from 10 to 30% by weight of styrene and/or vinyltoluene; and (d) from 0 to 20% and particularly 2 to 15% by weight of a least one other monolefinically unsaturated monomer which introduces into the polymer (II) polar groups, particularly carboxyl, amide, imide, amino or hydroxyl groups. In addition to unsaturated carboxylic acids having three to five carbon atoms, preferably in amounts of from 1 to 10% by weight, the monomers (d) may be particularly amides thereof such as acrylamide, methacrylamide, N-vinyl compounds such as N-vinylpyrrolidone, N-vinylcaprolactam, N-vinylcapryllactam, N-vinyllaurolactam, N-vinylsuccinimide, N-vinyldiglycolimide, N-vinyl-N-ethylacetamide or N-vinylimidazole. Olefinically unsaturated nitriles such as acrylonitrile or methacrylonitrile are also suitable as comonomers (d). Monoesters of acrylic and/or methacrylic acid with aliphatic diols having two to eight carbon atoms such as with ethylene glycol, 1,2-propylene glycol, 1,3-propylene glycol, 1,4-butanediol or diethylene glycol, are also very suitable as comonomers (d).

Polymers (II) of the said type whose K values (according to H. Fikentscher, Cellulosechemie, 13, 58 (1932)) are more than 15 are preferred.

Examples of polycondensates (II) which are soluble in the organic liquids and compatible with the polymers (I), and which may be used alone or with the polymers (II), are polyesters of polycarboxylic acids and polyols and alkyd resins, particularly polyesters and/or alkyd resins which have been modified with oils, colophony or colophony aducts and which have molecular weights of more than 1200 and preferably from 2500 to 4500, for example condensation products of phthalic acid and glycerol which have been modified with linseed oil.

Polymerization of the monomers for the copolymer (I) is preferably carried out at temperatures of from about 60° to 100° C. Conventional initiators which form free radicals and which initiate polymerization at from about 50° to 100° C., such as peroxides or azo compounds may be used for the polymerization, examples being benzoyl peroxide or azo isobutyronitrile. Naturally redox systems such as combinations of sulfinic acids with peroxides are also suitable.

Coating compositions according to this invention based on copolymers can be used alone or in combination with a conventional heat-curable aminoplast precondensate particularly as baking enamels. Low molecular weight condensates of urea, melamine or benzoguanamine with formaldehyde are particularly suitable as aminoplast precondensates. Formaldehyde condensates of urea, of melamine or of benzoguanamine which have been etherified with lower alkanols, especially n-butanol or isobutanol, are especially suitable. Examples of suitable condensates of this type are described for example in Ullmanns Encyklopädie der Technischen Chemie, 3rd volume, pp. 475 to 496 (1953). The content of these aminoplast condensates should be from 5 to 40%, preferably from 15 to 30%, by weight with reference to the copolymer (I).

Conventional binders such as epoxide resins, phenol resins and/or alkyd resins may be added to the coating compositions according to this invention. Conventional auxiliaries such as pigments, dyes, curing catalysts and flow improvers may also be added.

The coating compositions are suitable for the production of surface coatings on wood, ceramic material and plastics, especially however on metal, particularly iron, aluminum, magnesium and alloys containing these metals. They are therefore suitable for example for the surface coating of household articles, automobile parts and medical apparatus. They may be applied by conventional methods such as dipping, pouring, spraying, brushing and rolling.

Curing of the copolymers, i.e. baking of the surface coatings according to this invention, takes place at from about 100° to 150° C. The baking time depends on the temperature used. Thus for example surface coatings having optimum properties are obtained at 120° C. in one hour.

The invention is illustrated by the following examples. The parts and percentages given in the examples are by weight unless otherwise stated.

EXAMPLE 1

75 parts of a 65% solution of a polymer (II) from 20 parts of styrene, 75 parts of 2-ethylhexyl acrylate and 5 parts of N-vinylimidazole in a mixture of xylene and ethyl acetate in the volumetric ratio 5:2 is added to 700 parts of gasoline having a boiling range of from 80° to 140° C. 346 parts of ethyl acrylate, 68 parts of N-n-butoxymethyl-methacrylamide, 27 parts of 1,4-butanediol monoacrylate, 9 parts of acrylic acid and 9 parts of benzoyl peroxide is added. The whole is then heated for about one hour at from 77° to 80° C. while stirring. A dispersion of copolymer (II) is obtained which can be adjusted to a very stable dispersion having a solids content of 75% by removing 560 parts of solvent.

The dispersion is applied in a thin layer with p-toluenesulfonic acid as curing agent to a sheet of glass and a sheet of iron. The films are heated for one hour at 150° C. A clear coating is obtained which is very resistant mechanically and to water and which is insoluble in benzene.

EXAMPLE 2

259 parts of ethyl acrylate, 90 parts of methyl methacrylate, 54 parts of N-n-butoxymethylmethacrylamide, 18 parts of 1,4-butanediol monoacrylate and 9 parts of acrylic acid are mixed with 650 parts of gasoline having a boiling range of from 80° to 140° C., 80 parts of a 65% solution of a polymer (II) from 21 parts of styrene, 71 parts of 2-ethylhexyl acrylate, 3 parts of N-vinylimidazole, 2 parts of N-vinylcaprolactam and 3 parts of methyl methacrylate and 9 parts of benzoyl peroxide. The whole is then heated for seventy-five minutes at 80° C.

A stable dispersion of a copolymer (I) is obtained which is applied to a sheet of glass and a sheet of iron. A clear film is formed in each case. If p-toluenesulfonic acid is added to this dispersion during application and the coatings are heated for one hour at 150° C., coatings are obtained which are very resistant to water and solvents.

EXAMPLE 3

20 parts of tert-butyl acrylate, 5 parts of 2-ethylhexyl acrylate, 5 parts of di-n-butyl maleate, 20 parts of methyl methacrylate, 20 parts of vinyl propionate, 2 parts of N,N-diethylacrylamide, 3 parts of acrylonitrile, 5 parts of acrylic acid, 30 parts of N-n-butoxymethylmethacrylamide, 20 parts of N-n-butoxymethylacrylamide, 5 parts of N-methoxymethylmethacrylamide, 375 parts of 2-ethylacrylate, 3 parts of benzoyl peroxide, 0.5 part of di-tert-butyl peroxide and 0.1 part of azoisobutyronitrile are added to a mixture of 780 parts of gasoline and 90 parts of a 60% solution of a polymer (II) from 22 parts of styrene, 72 parts of 2-ethylhexyl acrylate, 3 parts of n-butyl acrylate and 5 parts of N-vinylpyrrolidone in a mixture of toluene, xylene and butyl acetate in the volumetric ratio 5:3:2. The whole is heated for one hour at from 85° to 90° C. while stirring. A dispersion in gasoline is obtained which gives (with or without curing agents) coatings which are very resistant to water and which protect against corrosion.

EXAMPLE 4

45 parts of methyl methacrylate, 38 parts of ethyl acrylate, 15 parts of N-butoxymethylmethacrylamide and 2 parts of acrylic acid and also 0.6 part of benzoyl peroxide are added to a solution of 10 parts of a commercial condensate of phthalic acid and glycerol which has been modified with linseed oil (54 parts of linseed oil to 46 parts of the phthalic acid-glycerol condensate) in 160 parts of gasoline having a boiling range of from 120° to 150° C. This mixture is kept at from 85° to 90° C. for about ninety minutes while stirring. A mobile, white, stable dispersion is obtained having a solids content of 40%.

EXAMPLE 5

15 parts of a commercial condensation product of glycerol and phthalic acid which has been modified with linseed oil (35 parts of linseed oil to 65 parts of phthalic acid-glycerol condensate) is dissolved in 170 parts of gasoline having a boiling range of from 120° to 150° C. and then 32 parts of ethyl acrylate, 20 parts of butanediol acrylate acetylacetate, 12 parts of N-butoxy methylmethacrylamide, 10 parts of butanediol monoacrylate, 24 parts of styrene and 2 parts of acrylic acid and also 0.8 part of benzoyl peroxide are added. This mixture is kept at 80° C. for about two hours while stirring. A mobile dispersion is obtained which has a solids content of 40% and which exhibits no phase separation whatever even after three months. When applied to sheet iron, this dispersion gives a coating which after it has been baked for thirty minutes at 120° C. is insoluble and practically unswellable in water and organic solvents.

We claim:

1. A coating composition based on a dispersion of a copolymer containing etherified N-methylolamide groups as a binder, which contains a copolymer (I) of
   (A) 50 to 95% by weight of a copolymerizable ester of a monoolefinically unsaturated carboxylic acid having three to five carbon atoms and an alcohol having one to eight carbon atoms;
   (B) 0.75 to 25% by weight of at least one-N-methylolamide of a copolymerizable olefinically unsaturated carboxylic acid having three to five corbon atoms which has been etherified with an alcohol having from one to eight carbon atoms; and
   (C) 0 to 40% by weight of at least one other copolymerizable monoolefinically unsaturated monomer;
dispersed in an organic liquid in which the copolymer (I) is insoluble, the said dispersion having been prepared by polymerization of the said monomers in the organic liquid in the presence of a free radical forming initiator and in the presence of 2 to 20% by weight, with reference to copolymer (I), of a polymer (II) having a molecular weight of more than 1200 which is compatible with the copolymer (I), which is soluble in the organic liquid and which has a dispersing action, said polymer (II) containing polymerized units of:
   (a) 65 to 80% by weight of an ester of acrylic or methacrylic acid and an alkanol having four to eighteen carbon atoms;
   (b) 10 to 30% by weight of styrene; and
   (c) 2 to 15% by weight of at least one monomer selected from the group consisting of N-vinylpyrrolidone, N-vinylcaprolactam, N-vinylsuccinimide and N-vinylimidazole, the percentage specified under (a), (b) and (c) totaling 100.

2. A coating composition as claimed in claim 1 wherein the monomer of component (c) consists of N-vinyl pyrrolidone.

3. A coating composition as claimed in claim 1 wherein the monomer of component (c) consists of N-vinyl imidazole.

References Cited

UNITED STATES PATENTS

| | | | |
|---|---|---|---|
| 2,680,110 | 6/1954 | Loughran et al. | 260—885 |
| 3,067,163 | 12/1962 | Bauer | 260—875 |
| 3,218,287 | 11/1965 | Schmidle et al. | 260—33.6 |
| 3,264,234 | 8/1966 | Osmond | 260—4 |
| 3,317,635 | 5/1967 | Osmond | 260—881 |

FOREIGN PATENTS

| | | | |
|---|---|---|---|
| 713,122 | 7/1965 | Canada | 260—22 |
| 934,038 | 8/1963 | Great Britain | 260—875 |
| 1,062,286 | 3/1967 | Great Britain | 260—875 |

DONALD E. CZAJA, Primary Examiner

R. W. GRIFFIN, Assistant Examiner

U.S. Cl. X.R.

117—124 E, 132 B, 161 UZ, 161 UC; 260—29.8, 32.8 R, 33.2 R, 33.6 UA, 851, 855, 895, 901